June 27, 1944.   G. COLARUSSO   2,352,372
HOSE CLAMP
Filed May 27, 1942
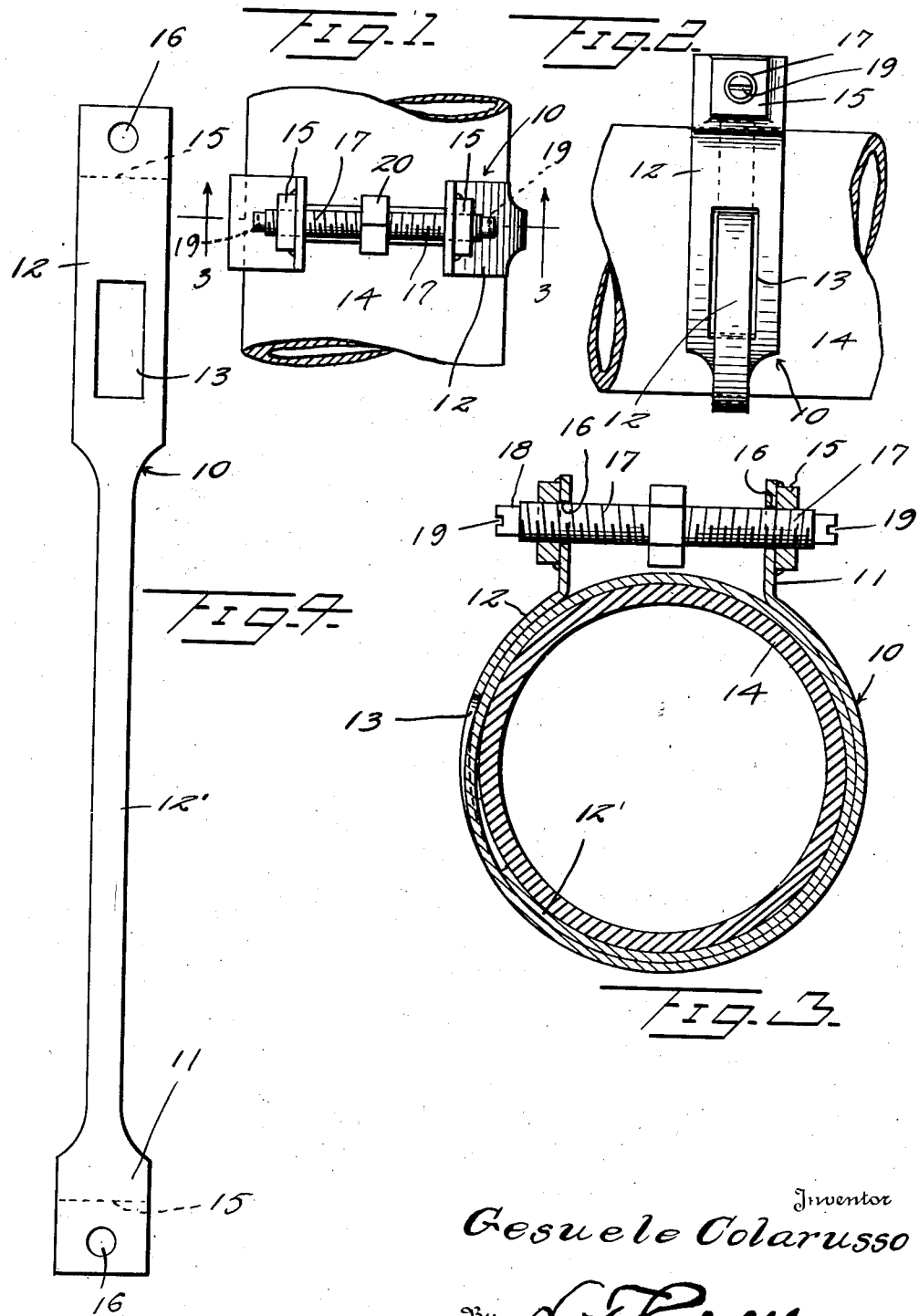
Inventor
Gesuele Colarusso
By L. F. Randolph
Attorney Patented June 27, 1944

2,352,372

UNITED STATES PATENT OFFICE 2,352,372

HOSE CLAMP

Gesuele Colarusso, Old Boston Settlement, Pa.

Application May 27, 1942, Serial No. 444,713

3 Claims. (Cl. 24—19)

This invention relates to a clamp for securing or connecting rubber or other flexible hose, tubing or the like.

It is especially aimed to provide a clamp or band which will engage the hose or equivalent throughout a complete circle or three-hundred and sixty degrees, with uniform pressure, preventing injury to the hose and less pressure to effect a joint, and at the same time to provide a structure wherein the ends of the clamp are tightened or moved at the same time and to the same extent.

It is also aimed to provide a construction wherein the ends of the band or clamp are screwed by opposite screw threaded means and which latter has a wrench-engaging part to facilitate displacement when rusted.

In addition, it is aimed to provide the band or clamp in a single piece.

Various additional objects and advantages will become apparent from a consideration of the description following taken in connection with accompanying drawing illustrating an operative embodiment.

In said drawing:

Figure 1 is a view showing the clamp in plan and engaged with a fragment of hose or tubing;

Figure 2 is a view of the same part as Figure 1 in side elevation;

Figure 3 is a transverse sectional view taken on the plane of line 3—3 of Figure 1, and Figure 4 is a plan view of the clamp in flat form.

Referring specifically to the drawing wherein like reference characters designate like or similar parts, reference is first to be had to Figure 4 wherein the clamp or band is shown in flat form. This band, clamp or strip is designated 10 and may be provided from any suitable metal, plastic or equivalent material. It is preferably stamped in a single piece in the shape shown and at opposite ends is widened at portions 11 and 12 and such portions are connected by a narrower portion 12.

Said wide portion 12 is shorter than portion 12 and it is provided with a longitudinally extending slot at 13.

The clamp or band 10 is flexible and is adapted to be wrapped around rubber or other flexible hose or tubing 14, or the equivalent, to clamp the latter to a pipe, join its parts or otherwise. In placing the band 10 around the hose 14, enlarged end 11 is passed through the slot 13 and hence it will be realized that the hose is completely or to the extent of three-hundred and sixty degrees surrounded and embraced by the clamp with the terminals of the clamp spaced apart, and with the band in flat contact with the hose.

Said terminals are preferably increased in thickness as by welding nuts 15 thereto. Openings 16 are thus provided through the terminals of the band 10 at the enlarged portions 11 and 12 and such openings 16 are oppositely screw threaded and engaged by the opposite screw threads at 17 on a bolt 18. Such bolt is provided with means whereby it may be turned in order to tighten the clamp about the hose and it will be realized that the screw or bolt simultaneously acts to the same extent on both ends of the band, resulting in the application of uniform pressure on the latter. To this end, the opposite ends of the bolt 18 may have kerfs or slots 19 to facilitate engagement by a screw driver or other tool. The bolt may also have a wrench engaging head at 20 to facilitate tightening or loosening and the latter is particularly important in removing the bolt after long usage and especially if rusted.

Threads 17 may be provided to any extent desired and may especially terminate or begin inwardly a distance from the slots 17.

Various changes may be resorted to provided they fall within the spirit and scope of the invention.

I claim as my invention:

1. A hose clamp or the like comprising a flexible strip provided with an opening through which one terminal of the band is adapted to be passed to completely surround and embrace hose or the like, and means operable to simultaneously move both terminals of the band, comprising a bolt having screw threaded portions at opposite ends thereof, the screw threaded portions being opposite and threaded to said terminals.

2. A hose clamp or the like comprising a flexible strip provided with an opening through which one terminal of the band is adapted to be passed to completely surround and embrace hose or the like, and means operable to simultaneously move both terminals of the band, comprising a bolt having screw threaded portions at opposite ends thereof, the screw threaded portions being opposite and threaded to said terminals and a wrench-engaging head on the bolt intermediate the terminals.

3. A hose clamp or the like comprising a flexible strip provided with an opening through which one terminal of the band is adapted to be passed to completely surround and embrace hose or the like, and means operable to simultaneously move both terminals of the band, comprising a bolt having screw threaded portions at opposite ends thereof, the screw threaded portions being opposide and threaded to said terminals and means on the bolt for engagement by a tool to turn the bolt.

GESUELE COLARUSSO.